United States Patent Office 2,773,860
Patented Dec. 11, 1956

2,773,860

PROCESS OF STABILIZING PHOSPHORUS SULFIDE-OXYGEN-CONTAINING ORGANIC COMPOUND REACTION PRODUCTS AGAINST LIBERATION OF HYDROGEN SULFIDE

John M. Musselman, Brecksville, Ohio, assignor to The Standard Oil Company, Cleveland, Ohio, a corporation of Ohio No Drawing. Application December 30, 1955,
Serial No. 556,459

6 Claims. (Cl. 260—125)

This invention relates to a process of reacting oxygen-containing organic compound-phosphorus sulfide reaction products with sulfur dioxide to stabilize them against generation of hydrogen sulfide.

Phosphorus sulfide-organic reaction products are now well known lubricating oil additives. These compounds are reported in the literature to impart extreme pressure properties to lubricating oils and greases, and to increase their load carrying capacity and film strength. These additives are also claimed to check oxidation of the lubricating base, and prevent sludge, carbonization and lacquer formation on cylinder and piston walls of internal combustion engines operating under high temperatures and pressures; they may also inhibit corrosion.

However, many additives which are reaction products of oxygen-containing organic compounds and phosphorus sulfide, although their engine use properties are usually excellent, have the disadvantage of generating sufficient amounts of hydrogen sulfide on storage or in use to be unpleasant. It has been demonstrated that this hydrogen sulfide actually is not a by-product of the reaction in which the additive is prepared, but is formed by chemical reaction or decomposition involving the additive in some way, and that this generation is expedited by heat and in the presence of moisture. Hydrogen sulfide is generated after all of the hydrogen sulfide remaining after preparation of the reaction product is removed or destroyed.

In order to satisfy industry requirements for stability against generation of hydrogen sulfide, phosphorus sulfide-organic additives should not liberate hydrogen sulfide after storage or use for 72 hours at 150° F. The oxygen-containing organic compound-phosphorus sulfide additives presently available in commerce normally do not meet this requirement. An odor of hydrogen sulfide is offensive at concentrations above 3 p. p. m. A number of commercial lubricating oils taken at random containing a high concentration of an oxygen-containing organic compound-phosphorus sulfide additive have been found to exceed this.

In accordance with the present invention, organic compound-phosphorus sulfide additives are stabilized against generation of hydrogen sulfide by reaction with potassium hydroxide and with sulfur dioxide, each reaction being carried out desirably in the presence of water, and at a temperature of at least 150° F. In this reaction hydrogen sulfide present in the additive is destroyed, and in addition the additive is so changed chemically that hydrogen sulfide is no longer generated under the test conditions described hereinafter.

In this reaction free hydrogen sulfide present in the oil and/or the additive is thought to be removed in accordance with the following chemical equation:

$$2H_2S + SO_2 \rightarrow 3S + 2H_2O$$

This is not the only reaction which takes place, since not only is free hydrogen sulfide removed, but also the additive is stabilized against further generation of hydrogen sulfide for periods up to 500 hours or more, as measured by the hydrogen sulfide stability test. In this reaction, it is thought that the sulfur dioxide reacts with mercaptan (SH) linkages in the phosphorus sulfide reaction product, converting adjacent pairs of SH linkages to disulfide (S—S) linkages. Disulfide linkages are not reactive with water, and therefore this conversion prevents formation of hydrogen sulfide in the presence of heat and/or moisture. Mercaptan linkages are well known to be unstable under such conditions and are lost with the production of hydrogen sulfide.

This theory is in accord with the available evidence. The reaction in accordance with the invention does not increase the sulfur content of the additive substantially. The sulfur content of the stabilized additive is not more than about 1.5% higher than that of the unstabilized additive. In many cases, the sulfur content is actually reduced by the process. This shows that the process of the invention cannot be a sulfurization. Absence of a substantial change in sulfur content is understandable if the potassium hydroxide and sulfur dioxide only link —SH linkages to form —S—S— linkages, since this of course does not involve addition of sulfur to the molecule.

Simple removal of $H_2S$ by steam, nitrogen, or vacuum stripping does not stabilize the oil against formation of $H_2S$.

The potassium hydroxide is thought to react with acidic components of the additive. This accounts for the increase in ash weight and in some way protects color and improves color stability and hydrogen sulfide stability.

However, inasmuch as the structure of phosphorus sulfide-oxygen-containing organic compound reaction products has not been completely elucidated, these reactions are only a hypothesis. They have not yet been proved. A definite conclusion that can be made is that the potassium hydroxide and sulfur dioxide react with latent hydrogen sulfide-producing components of the additive, and stabilize them so that hydrogen sulfide is no longer generated within the requirements of the hydrogen sulfide stability test.

In the hydrogen sulfide stability test, the additive's ability to generate hydrogen sulfide is determined as an 8% solution in an SAE No. 20 lubricating oil by storing the solution in a closed container at 150° F. until hydrogen sulfide is detected by moistened lead acetate paper held over the oil. This paper will turn gray or black if hydrogen sulfide is present in a concentration of about 1.0 p. p. m. over the oil. The time required before hydrogen sulfide is liberated is reckoned as hours to failure, and to pass the test the time must be at least 72 hours. The storage temperature of 150° F. is the maximum that would be encountered under most conditions of handling and distribution.

The 16 hour test is more severe than the hydrogen sulfide stability test. The treated additive is heated at 150° F. for 16 hours, and the $H_2S$ concentration in p. p. m. determined by removing the hydrogen sulfide from the oil with nitrogen and passing the resulting gas mixture through ammoniacal zinc sulfate solution. The precipitated zinc sulfide is determined iodometrically. A value of less than 0.1 p. p. m. in this test indicates that an 8% solution of the additive in a motor oil will operate at least 500 hours before failure under the condition of the hydrogen sulfide stability test.

Oxygen-containing organic compound-phosphorus sulfide additives are well known to the art and per se form no part of the present invention, which relates only to the treatment thereof with potassium hydroxide and with sulfur dioxide. However, the following brief description is given of these reaction products for the aid and convenience of those skilled in the art in understanding the additives to which the present invention is applicable.

Phosphorus sulfide oxygen-containing organic compound additives may be made with direct admixture of reactants or, if desired, in the presence of a diluent oil which may or may not subsequently be removed. In either case, the entire reaction mixture which is obtained is referred to herein as the additive. A lubricating oil may be used as the diluent. The term "diluent" is used for convenience, but it is not intended to imply that the diluent oil is inert; it will take part in the reaction if it is reactive with the phosphorus sulfide under the reaction conditions.

The additives of the present invention are primarily intended for use by addition to lubricating oils. Such oils, after refinement, such as by solvent extraction and solvent dewaxing, have mixed with them a small amount of the additive. It has been found in practice that the additives can be made much more soluble in lubricating oil if they are prepared in a lubricating oil. Many of the reaction products reacted with potassium hydroxide and sulfur dioxide in accordance with the present invention, if made without an oil present can only be dissolved with difficulty, if at all, in lubricating oil. Their solubility is greatly enhanced if the reaction product in the first instance is prepared in the presence of an oil. This procedure is preferred.

The reaction is usually complete in about 10 hours or less, generally 1 to 2 hours. The reaction time is a function of temperature, the amount of the sulfide that is to react, the degree of subdivision of the reactants, the efficiency of mixing, etc.

The oxygen-containing organic compound or mixtures thereof may be reacted with the phosphorus sulfide or a mixture of phosphorus sulfides in ratios from 5 to about 60% by weight of the phosphorus sulfide. Generally about 10 to about 50% is the usual amount that will be used, depending upon the molecular weight of the oxygen-containing organic compound, and about 10 to 20% is especially desirable.

Phosphorus pentasulfide is preferred, although other phosphorus sulfides, such as phosphorus sesquisulfide and phosphorus trisulfide, or mixtures thereof with phosphorus pentasulfide, may be employed. Phosphorus pentasulfide is least expensive and readily available, and for this reason is used in the illustrative examples.

The oxygen-containing organic compound may contain oxygen in the form of a hydroxyl, carbonyl, carboxyl, or ether group, or a mixture thereof.

Alcohols, carbonyl compounds such as ketones, aldehydes, and amides, carboxyl compounds such as esters and acids, and ethers are typical classes of oxygen-containing organic compounds. The compounds can contain a plurality of functional oxygen groups, i. e., polyalcohols, polyacids, polyamides, polyethers, polyketones, polyesters, and polyaldehydes. Many mixed classes also are available, such as hydroxy acids, esters, ethers, amides, ketones, and aldehydes. Usually, from 1 to 3 like or unlike functional oxygen groups are sufficient although higher polyfunctional compounds could be utilized for special effects. Saturated and unsaturated aliphatic and cycloaliphatic compounds, aromatic compounds, and mixed aliphatic-aromatic, aliphatic-cycloaliphatic and cycloaliphatic-aromatic compounds are within the scope of the invention. Desirably, the compound has a rather high molecular weight and a boiling point above the reaction temperature, properties usually found in compounds of at least eight carbon atoms. However, if the substance has a low boiling point, the reaction may be conducted under pressure, if desired. Preferably compounds having twelve or more carbon atoms, and generally not over twenty carbon atoms are employed, although compounds of up to 52 carbon atoms or more are suitable. Also, halogenated derivatives of any of these classes of compounds are suitable.

Illustrative of some conveniently applicable ester materials are: degras, lanolin, sperm oil, beeswax, ester waxes, butyl stearate, ethyl lactate, methyl oleate, methyl palmitate, butyl ricinoleate, butyl phthalate, methyl stearate, methyl dichlorostearate, methyl chloro-naphthenate, coconut oil, palm oil, babassu oil, hydrogenated linseed, coconut and other vegetable and fatty oils.

A few ethers are di (dodecyl) ether, methyl stearyl ether, ethylene glycol monoethers and ethylene glycol chlorohydrin.

Typical acids are palmitic acid, abietic acid, rosin, modified rosin, myristic acid, naphthalic acid, dichloropalmitic acid, naphthoic acid, benzoic acid, naphthenic acids, hydroxystearic acid, dihydroxybenzoic acids, hydroxynaphthenic acids, dihydroxystearic acid, chlorobenzoic acid, dichlorodihydroxystearic acid, lactones, oxidized petroleum fatty acids or other oxygen-containing or acidic petroleum products, as oxidized wax, kerosene, gas oil or other oxidized petroleum oil.

A large variety of aliphatic amides are suitable. The preferred amides are those which contain either an amido hydrogen (a hydrogen directly connected to the nitrogen), or an olefinic double bond, or both. Typical amides are those which correspond to a carboxylic acid obtainable from natural products, such as dodecanoyl amide, tetradecanoyl amide, octadecanoyl amide, eicosanoylamide and the corresponding unsaturated amides containing one or more olefinic double bonds in the molecule. The amides may contain a lower aliphatic substituent for one or both of the amido hydrogens in many instances. These may be represented by the formula

where R is an aliphatic hydrocarbon radical and X and $X_1$ are hydrogen and/or a lower aliphatic substituent, such as methyl and ethyl up to amyl. The amide stock used may be a mixture of amides of different molecular weight or different degrees of unsaturation. It need not be pure and amounts of other amides may be present.

Typical alcohols which may be used include lauryl alcohol, stearyl alcohol, alcohols derived from coconut oil, sperm oil, palm oil and cottonseed oil, degras, oleyl alcohol, and octyl alcohol.

Representative ketones are methyl dodecyl, xylyl heptadecyl, dioctadecyl, diheptadecyl, ethyl heptadecyl, propyl heptadecyl, and hydroxyphenyl heptadecyl ketones. Palmitone (commercial dipalmityl ketone) is a readily available higher ketone. The ketone stock may be a mixture of the ketones of different types or different molecular weights or both.

The compound used in forming the reaction product should be selected with reference to the use of the final composition and properties desired in it, e. g., to give a reaction product having oil solubility or dispersibility.

It will be understood that up to 90% of the oxygen-containing organic compound may be replaced in part by a nonoxygen-containing organic compound reactive with phosporus sulfide, such as saturated and unsaturated aliphatic amines, and aromatic and unsaturated aliphatic and cycloaliphatic hydrocarbons. Large numbers of these compounds have been used in the preparation of mixed phosphorus sulfide-organic reaction products, and are therefore well known to the art.

Amines of higher molecular weight may be used, such as primary and secondary saturated and unsaturated aliphatic amines and unsaturated tertiary aliphatic amines, such as octadecyl amine, dioctadecyl amine, octadecynyl amine, hexadecyl amine, octadecynyl dimethyl amine and dodecyl amine. Preferably the amine has an aliphatic radical of at least ten carbon atoms, the other substituent, in the case of a secondary or tertiary amine, having from one to five carbon atoms.

Other desirable substitutes for a part of the oxygen-containing organic compound are unsaturated hydrocarbons having from 6 to 25 carbon atoms and one or more pairs of double or triple bonded carbon atoms. High molecular weight olefin polymers having a molecular weight above 150 up to about 50,000 are very useful. One such olefin polymer is the so-called "motor polymer" or "reduced motor polymer" which is usually made from $C_3$ and $C_4$ olefins by nonselective polymerization, e. g., with a phosphorus acid type catalyst. Motor polymer boils in the range from 80 to 500° F. with a major portion boiling in the range from 120 to 400° F. A polymer gasoline fraction may be removed therefrom by fractional distillation to the 250° F. cut point, and this fraction is called "reduced motor polymer." Its average molecular weight is about 145, and it preferably contains a major amount of branched chain olefins boiling below 600° F.

Another polyolefin which is especially useful is one which improves the viscosity index of lubricating oil, which has a molecular weight of about 2,000 to 100,000 and which is substantially saturated. A commercially available material of this type is known as "Paratone." This is a polyisobutylene polymer having a molecular weight from 10,000 to 20,000, in solution in a lubricating oil in an amount to give a viscosity of about 3,000 SSU at 210° F.

Terpenes and turpentine are typical cycloaliphatic and mixed aliphatic-cycloaliphatic-aromatic hydrocarbons, of which p-cymene, camphorene, cyclene, bornylene, camphene, α-pinene, sylvestrene, dipentene and 1,8-terpin are examples.

The reaction of the individual reactants selected from the above classes may be carried out in the presence or absence of air or in an inert atmosphere such as nitrogen or hydrogen sulfide. It may also be carried out under pressure.

The reaction temperature varies with the organic compound and is readily ascertained. The optimum is in the range of 225 to 600° F., above thiophosphate formation, although a higher temperature which is below that at which the reaction product would be decomposed could be used. A temperature of at least 250 to 350° F. is preferred in many cases.

The final reaction mass is preferably centrifuged, filtered or settled and decanted in order to remove the by-product, sludge or other insoluble material. Any excess of a volatile constituent or diluent may be removed by distillation. If desired, the final product may be solvent-extracted with a suitable solvent, such as liquid propane, isopropyl alcohol, acetone or other solvent known in the art, or contacted with an absorbent, such as activated charcoal, silica gel, activated clay and the like.

Although the process of the invention does not involve a sulfurization, it is applicable to sulfurized additives. An element of the sulfur family can be incorporated into the additive by conventional sulfurization techniques. This sulfur can be incorporated by adding elemental sulfur or a compound which yields sulfur, such as by treating the reaction product therewith or treating a derivative of the reaction product therewith.

If additional reacted sulfur is to be present in the additive, about 0.01 to 2.0 and preferably 0.1 to 1.0 gram atomic weights of sulfur per mole of the phosphorus sulfide is used. Additional reacted sulfur may be incorporated simultaneously with or after the formation and cooling of the primary reaction product. If added afterwards, the mass is maintained at about 200 to 300° F. for from a few minutes to several hours, and preferably about one hour. Selenium and tellurium function much in the same way as sulfur in this respect. Alternatively, the sulfur can be added to the metal, nitrogen base or ester derivative.

As is well known, phosphorus sulfide-organic compound reaction products may also be utilized in the form of their metal, nitrogen base or ester derivatives, or mixtures of these derivatives, with the original reaction product. These derivatives are formed from compounds capable of replacing an acid hydrogen atom in the phosphorus sulfide-organic reaction product, although the formation of the above derivatives may itself involve replacement of an acid hydrogen in the reaction product.

The metal derivatives may be formed from one or more metal compounds, such as their sulfides, oxides, hydroxides, carbides and cyanamides. The preferred metals are those of groups I, II and III of the periodic table, such as potassium, sodium, calcium, magnesium, beryllium, zinc, barium and aluminum. For some purposes, the heavier metals are especially useful, such as chromium, cadmium, tin, lead, antimony, bismuth, arsenic and the like.

The metal derivatives may be formed by reacting the phosphorus sulfide-organic reaction product with the corresponding metal compound at temperatures in the range of about 100 to about 350° F., a temperature in the range of about 180 to 250° F. being preferred.

When a metal, nitrogen base or ester derivative containing subsequently added reacted sulfur is desired, there are two alternative ways of producing it: (1) the original or primary reaction product can be reacted with an element of the sulfur family and this reaction product then converted into the metal derivative, or (2) the primary reaction product can first be converted into the metal derivative and this derivative then reacted with an element of the sulfur family.

From about 0.2 to about 6.0 equivalents of a metal compound may be used per mole of the sulfide used in the sulfide-derived reaction product, preferably about 1.0 to about 3.0 equivalents.

The metal additive compounds, especially those fully saponified so as to have a high metal content, may be mixed with oils to form greases, with or without conventional soaps, and in such cases the metal additive compounds serve to thicken the oil as well as to stabilize it and impart a detergent action.

The nitrogen base derivatives may be prepared by reacting the primary or sulfur-containing reaction product with one or more basic nitrogenous compounds, such as ammonia, organic amines or heterocyclic bases. Generally, ammonia and the gaseous or liquid organic amines are preferred, such as methyl amine, diethyl amine, butyl amine, trimethyl amine, ethyl propyl amine, and isopropyl amine. Polyamines may also be used. From about 0.25 to about 6.0 equivalents of the nitrogen base may be used per mole of the phosphorus sulfide in the primary reaction product, preferably about 1 to about 4 equivalents.

The ester derivatives may be prepared by reaction of the primary reaction product with one or more alcohols, or thioalcohols, i. e., alkyl, aryl, cycloalkyl and heterocyclic compounds containing a hydroxyl or thiohydroxyl group. The term "ester derivative" is used herein in its generic sense to include esters of any of the above types of compounds. The ester derivatives may be formed by reacting the primary reaction product with the hydroxy or thiohydroxy compound at temperatures in about the range of 100 to 350° F., a temperature of 180 to 280° F. being preferred. From about 0.2 to 6.0 equivalents of the esterifying agent may be used per mole of the phosphorus sulfide in the primary reaction product, preferably about 1.0 to about 4.0 equivalents.

It is beneficial to have water present in the reaction mixture when forming the metal or nitrogen base derivative, and this may be introduced as water of crystallization or as a hydrate of the metal compound, or of the nitrogen base, or it may be introduced separately.

A plurality of metals or nitrogen bases or of esterifying agents or mixtures of any two or more thereof may be used. If the amount of the metal nitrogen base or alcohol or combinations thereof is small, the final product may be a mixture of the initial reaction product and the metal nitrogen base or ester derivative.

Obviously the description herein of the preparation of phosphorus-sulfide-oxygen-containing organic compound reaction products cannot be exhaustive in view of space limitations. Further details of the preparation of these reaction products will be found in the following patents, which are well known to those skilled in the art:

| | | | |
|---|---|---|---|
| 2,142,998 | Chittich | 2,357,346 | Musselman |
| 2,211,231 | Henderson | 2,358,305 | Cook |
| 2,211,306 | Whittier | 2,361,746 | Cook |
| 2,235,860 | William | 2,361,957 | Musselman |
| 2,242,260 | Prutton | 2,362,624 | Gaynor |
| 2,257,750 | Lincoln | 2,364,283 | Freuler |
| 2,257,751 | Lincoln | 2,364,284 | Freuler |
| 2,261,047 | Asseff | 2,365,209 | Musselman |
| 2,308,427 | Roehner | 2,368,000 | Cook |
| 2,329,436 | Cook | 2,373,094 | Berger |
| 2,337,868 | Burwell | 2,375,060 | Williams |
| 2,355,106 | Prutton | 2,375,061 | Williams |
| 2,356,074 | May | | |

The above as well as other patents will be found briefly discussed in the article "Use of phosphorus sulfide organic reaction products as 'lube' oil additives" by George G. Pritzker in National Petroleum News, December 5, 1945 (vol. 37, No. 49).

In accordance with the invention the phosphorus sulfide-oxygen-containing organic compound additive mixture is reacted with potassium hydroxide and with sulfur dioxide gas under conditions such that the sulfur content of the resulting additive is not more than about 1.5% higher than that of the starting additive.

Each reaction proceeds at an elevated temperature, generally in excess of 150° F. and preferably in excess of 175° F. The upper limit is determined by the stability of the reaction product being treated and is not critical.

The reaction with potassium hydroxide is carried out at an elevated temperature, desirably in excess of 150° F. and preferably in the range of 180° F. to about 250° F. The upper limit is determined by the stability of the additive and is not critical. The reaction time is a function of the temperature, the potassium hydroxide concentration, rate of mixing and similar reaction conditions, and is not critical. From 30 to 60 minutes usually is ample, but much longer times could be used.

Any amount of potassium hydroxide will improve the additive, but at least 0.1% usually would be used. An additional improvement is obtained if the reaction is carried out in the presence of a small quantity of water, usually at least 0.25% by weight of the reaction mixture, or more. The maximum amount of potassium hydroxide would be determined by the increase in ash weight, for the ash specifications of the additive would not be exceeded. If water is used, the amount of potassium hydroxide is best expressed in terms of the treating ratio of $$\frac{H_2O}{KOH}$$

At the 0.25% water level, the additive is continuously improved as the amount of potassium hydroxide is increased up to the 1:2 ratio or 0.50% potassium hydroxide, and then levels off. At the 0.50% water level, best hydrogen sulfide stability again is obtained at the 1:2 ratio or 1.0% potassium hydroxide. In each of these cases 30 minutes is the optimum reaction time, but up to 60 minutes can be used. At the 1.0% water level, the upper limit of benefits is approached, and the optimum ratio is 1:1 or less. Thus about 1% potassium hydroxide and 1% water are the maximum amounts.

Generally speaking, increasing amounts of water give increased stability against generation of hydrogen sulfide but adversely affect color and color stability. Increasing amounts of potassium hydroxide give improved additive color and reduced hydrogen sulfide formation, with an increase in ash content and usually a reduction in sulfur content. Satisfactory engine performance is obtained at equal ratios of potassium hydroxide and water, and improved performance when the potassium hydroxide is in excess of water. Longer reaction times are favorable up to about 1.25% total OH ion concentration—thereafter reaction times of 30 minutes are better.

Best results are had using 0.5% potassium hydroxide, 0.25% water, and a 30 to 60 minute reaction time at 180 to 250° F.

The potassium hydroxide can be in any physical form. Flake potassium hydroxide is used in the examples for convenience, but aqueous solutions can also be used if the reaction is to be carried out in the presence of water.

The O. D. color is protected and the color stability of the additive enhanced by this treatment, in addition to the improvement in hydrogen sulfide stability. These are improved the most by the larger amounts of potassium hydroxide and water and the longer reaction times. The demerit rating of the additive also may be improved, even though the sulfur content is reduced. However, the sulfur and ash contents are well within permissible limits.

The reaction with sulfur dioxide gas also is carried out at an elevated temperature, generally in excess of 150° F. and preferably in excess of 175° F. The upper limit is determined by the stability of the additive being treated and is not critical.

The reaction time is a function of the temperature, sulfur dioxide concentration and pressure, rate of mixing and like reaction conditions, and likewise cannot be definitely specified. At a reaction temperature of 175 to 200° F., a reaction time of two hours or more is indicated, while at more elevated temperature, say 250° F., one hour is more than ample. In a commercial process, for maximum utilization of equipment, it would be preferable to employ a reaction temperature which will permit a reaction time of one hour or less, i. e., a temperature of 250° F. or over.

Because of the high reaction temperatures, gaseous sulfur dioxide is employed. The reaction is best conducted in pressure equipment, at atmospheric or superatmospheric pressures. The higher the pressure, up to a limiting pressure, the less sulfur dioxide is required. At a pressure of five pounds per square inch above atmospheric, for example, one-seventh the amount of sulfur dioxide needed at atmospheric pressure is required. Also, better hydrogen sulfide stability is obtained at higher pressures. Pressures in the range from 5 to 30 pounds per square inch above atmospheric are convenient and practical, and give very satisfactory results, and therefore are preferred.

The reaction will proceed more smoothly and the hydrogen sulfide stability of the final additive will be enhanced if the reaction is started in the presence of a small amount of water, usually at least 0.25% water by weight of the reaction mixture, or more. Large quantities are not necessary since water is produced as a by-product of the reaction, and actually for this reason it is not essential that water be added. The upper limit of the amount of water initially added is not critical, but about 1% water is the optimum employed, in view of the formation of water in the course of the reaction.

As little as 0.5% (5,000 p. p. m.) sulfur dioxide by weight of the additive may be sufficient to achieve good hydrogen sulfide stability, although the amount required depends on the additive. From 1 to 1.5% (10,000 to 15,000 p. p. m.) sulfur dioxide by weight of the additive is usually preferred. Larger amounts may be used where desired, but obviously it is uneconomic to use more than the minimum required to achieve satisfactory stability. Experience has indicated that over 5% sulfur dioxide will be wasteful, and amounts in excess of this are usually avoided. These amounts are too small to effect a sulfurization of the additive. Even 10% sulfur dioxide will not under the reaction conditions increase the sulfur content of the additive to more than about 1.5% higher than that of the starting additive.

At the conclusion of the reaction the reaction mixture can be blown with air at an elevated temperature to remove water and excess sulfur dioxide.

The reaction may be carried out on an additive which is either in the impure state, as taken from the reaction vessel in which it is prepared, or which has been subjected to conventional purification steps, such as solvent extraction, filtration, or treatment with activated clay, as set forth above. The additive can contain free hydrogen sulfide since, as has been stated, sulfur dioxide reacts with and eliminates free hydrogen sulfide as well as with the components present in the reaction product which generate hydrogen sulfide upon storage.

The potassium hydroxide and sulfur dioxide reactions may be carried out in the presence of a diluent. If the product is oil-soluble, the diluent can be a lubricating oil. If the additive has been prepared without an oil (see column 3, starting at line 1), an oil preferably is added before the reactions. The reaction mixture preferably should comprise 25 to 75% by weight of a hydrocarbon oil of lubricating viscosity such as those available in commerce. Generally speaking, a greater proportion of such oils in the reaction mixture will result in less severe, but more inefficient, reactions in accordance with the invention. Where the oil proportion is below 25%, low reaction temperatures within the stated range may be desirable to avoid a loss in the potency of the treated additive or reaction mixture.

In order further to improve the properties of the additive, it can be reacted with elemental sulfur before or after the potassium hydroxide or sulfur dioxide reactions. This increases the sulfur content, enhancing the engine performance characteristics, without upsetting the hydrogen sulfide stability imparted by the potassium hydroxide and sulfur dioxide reactions.

Amounts of sulfur up to 1% can be used to advantage, and reaction temperatures of from 150 to 350° F., preferably 250° to 300° F., are satisfactory.

If elemental sulfur is used, the sequence in which sulfur, potassium hydroxide and sulfur dioxide are reacted with the additive is not critical. Any of the five possible permutations can be used. But if no sulfur is reacted, it is important that the potassium hydroxide reaction be carried out first. Treatment of a sulfur dioxide-reacted additive with potassium hydroxide leads to no benefit other than that obtained from the sulfur dioxide reaction. Evidently the sulfur dioxide eliminates or renders unreactive the components of the additive which are reactive with potassium hydroxide, and this is undesirable.

In order to illustrate the invention, the following specific examples are given. Obviously, a very large number of examples of application of the process of the invention to the very large number of known phosphorus sulfide-oxygen-containing organic compounds could be given, in view of the very large number of such derivatives known to the art, but space requirements make it impossible to give more than one example each for treatment of a few specific embodiments of representative phosphorus sulfide-oxygen-containing organic compound reaction products.

*Examples 1 to 12*

20 parts by weight of phosphorus pentasulfide was mixed with 33 parts of No. 225 Red oil (a conventional acid-treated Mid-Continent lubricating oil base stock of SAE 20) to form a slurry, and this was mixed with a mixture of 25 parts of degras (a crude grease obtained by washing sheep's wool) and 75 parts of Paratone (a polyisobutylene having an average molecular weight of about 10,000 dissolved in a neutral oil and available commercially as a lubricating oil viscosity index improvement additive). 67 parts of the Red oil was then added and the mixture agitated for one hour at 300° F. It was then allowed to settle and was decanted. The decanted mixture was contacted with clay, filtered, and then mixed with 200 parts of No. 225 Red oil. It had an ash weight of 0.66% and 2.74% sulfur, both by weight.

75 parts of the additive as prepared above and 0.25 to 1.0 part water, if it was to be added, were placed in a pressure vessel equipped with a stirrer. The vessel was fitted with a tube for admitting the sulfur dioxide gas.

The additive was heated at a rate of 3° F. per minute to 150° F. At this point flake potassium hydroxide, if it was to be added to the batch, was added in small portions over a temperature from 150 to 180° F. in an amount up to 1% by weight of the additive. Thereafter the vessel was sealed. The potassium hydroxide reaction was then continued at 250° F. for 30 minutes, after which the reaction mixture was blown with air for 10 minutes at 250° F.

The mixture was charged with 15,000 p. p. m. of $SO_2$ gas, which was added at a steady rate over a fifteen-minute period. Reaction was then continued for 30 or 60 minutes at 250° F. The finished additive was blown with air for 10 minutes at 250° F. to remove unreacted sulfur dioxide, and the mixture filtered with the aid of 2% filter aid.

In order to evaluate the effect of water, potassium hydroxide and $SO_2$, in several batches no water and/or no potassium hydroxide and/or $SO_2$ were added.

The properties of the additives were then determined, with the following results reported:

| Example No. | $H_2O$ Wt. Percent | KOH | $SO_2$ Data ||||| Wt. Percent S | Wt. Percent Ash | O. D. Color | 8% Blend in SAE No. 20 Oil ||| 16 Hr. Test | $H_2S$ Stability Test ||
|---|---|---|---|---|---|---|---|---|---|---|---|---|---|---|---|---|
| | | | $SO_2$ Added, p. p. m. | Dissd. $SO_2$, p. p. m. | $SO_2$ Above Liquid, p. p. m. | $SO_2$ Consumed, p. p. m. | Reaction Time, Minutes | | | | Color Stability ||| $H_2S$ Evol. 16 Hrs. at 150° F., p. p. m. | Hrs. to $H_2S$ Failure | $H_2S$, p. p. m. After Failure |
| | | | | | | | | | | | Color, O. D. | ODD 16 Hrs. at 212° F. | | | |
| 1 | | | | | | | | 2.74 | 0.66 | 207.5 | 65.0 | 58.0 | 203.2 | 16 | 18.8 |
| 2(a) | | | 13,600 | 2,286 | | | 30 | 2.79 | | 287.0 | 73.0 | 34.0 | 256.0 | 16 | 9.6 |
| 2(b) | | | 13,600 | 3,537 | 4,710 | 5,350 | 60 | 2.82 | 0.71 | 425.0 | 87.0 | 51.0 | 85.4 | 16 | 9.7 |
| 3 | 0.25 | | 14,000 | 166 | 2,750 | 11,084 | 60 | 3.00 | 0.54 | 522.0 | 110.0 | 60.0 | 39.8 | 88 | 2.2 |
| 4 | 0.50 | | 15,000 | 2,238 / 2,268 | 3,160 | 9,572 | 60 | 2.95 | 0.61 | 418.0 | 89.1 | 60.9 | 38.2 | 136 | 5.0 |
| 5 | 1.00 | | 15,350 | 2,558 | 3,100 | 9,692 | 60 | 3.13 | | 511.0 | 108.0 | 42.0 | 29.7 | 160 | 1.3 |
| 6(a) | 0.25 | 0.25 | 16,000 | 2,891 | | | 30 | 2.66 | | 319.0 | 70.0 | 24.0 | 83.3 | 112 | 5.6 |
| 6(b) | 0.25 | 0.25 | 16,000 | 122 | 2,640 | 13,238 | 60 | 2.90 | 1.28 | 379.0 | 73.5 | 33.5 | 28.3 | 112 | 2.5 |
| 7 | 0.25 | 0.50 | 15,600 | 2,179 / 3,252 | 3,430 | 8,912 | 60 | 2.86 | 1.42 | 326.0 | 75.0 | 8.0 | 22.5 | 208 | 1.7 |
| 8(a) | 0.25 | 1.00 | 16,670 | 1,139 | | | 30 | 2.80 | | 228.0 | 67.2 | 4.8 | 9.4 | 136 | 3.3 |
| 8(b) | 0.25 | 1.00 | 16,670 | 1,315 | 3,100 | 12,255 | 60 | 2.84 | 2.18 | 239.0 | 69.8 | 5.2 | 9.9 | 136 | 1.7 |
| 9(a) | 0.50 | 0.50 | 14,700 | 2,638 | | | 30 | 2.71 | | 265.0 | 63.0 | 22.0 | 30.9 | 88 | 1.7 |
| 9(b) | 0.50 | 0.50 | 14,700 | 1,877 | 1,240 | 11,580 | 60 | 2.67 | 1.63 | 292.0 | 74.0 | 18.0 | 16.4 | 88 | 1.1 |
| 10 | 0.50 | 0.50 | 16,000 | 1,171 / 2,312 | 2,400 | 11,280 | 60 | 2.83 | | 272.0 | 70.0 | 23.0 | 13.0 | 112 | 2.0 |
| 11 | 0.50 | 0.50 | 15,800 | 610 | | | 30 | 2.67 | | 245.0 | 67.2 | 8.8 | 4.1 | 160 | 1.1 |
| 12(a) | 1.00 | 1.00 | 15,800 | 116.9 | | | 30 | 2.96 | | 214.0 | 63.9 | 10.7 | 9.3 | 136 | 1.2 |
| 12(b) | 1.00 | 1.00 | 15,800 | 1,330 | 4,570 | 9,900 | 60 | 2.56 | 2.22 | 227.5 | 65.0 | 13.8 | 18.3 | 102 | 1.1 |

Example 1 is the control. Example 2 shows the effect of $SO_2$ alone, and Examples 3, 4 and 5 the effect of $SO_2$ and $H_2O$ alone. $SO_2$ alone at a one hour reaction time effects a marked improvement in $H_2S$ stability (Example 2(b)) while the addition of 1% water is even better (Example 5). In all these, however, the O. D. color is worse than the control. When KOH is used even in small amounts (Example 6) color is improved, and at higher KOH levels (Examples 7 to 12) both color and $H_2S$ evolution are held at a minimum and color stability at an optimum. Example 5 is best in terms of $H_2S$ evolution, but worst in color. Examples 6, 7, 9, 10 and 12 represent a satisfactory compromise between color and $H_2S$ stability, and meet specifications for both. Examples 8 and 11 are the optimum, and are the equal of Example 5 in $H_2S$ stability and its superior in color and color stability.

These data show that the KOH treatment protects color, and adds to the hydrogen sulfide stability, compared to $SO_2$ treatment alone.

Many of these additives were then tested by the ethyl motor test for engine performance, under the following conditions:

| | |
|---|---|
| Procedure | II. |
| Type engine | Series 30 ethyl. |
| Engine speed | 1200 R. P. M. |
| Sump temperature | 300° F. |
| Jacket temperature | 212° F. |
| Air fuel ratio | 15 to 1. |
| Compression ratio | 7 to 1. |
| Catalyst | None. |

For comparative purposes, the test values for piston skirt, acid number, naphtha insolubles, and 1/100 the viscosity increase are added. The resulting value is termed the demerit rating.

A conventional acid-treated Mid-Continent lubricating oil base stock (SAE 20) and blended compositions of this oil with 8% of the additive treated in accordance with the invention were submitted to tests in accordance with the above described ethyl motor procedure. The base oil was identical in all runs. The results in the following table are typical:

| Example No. | Sludge, Percent | Acid No. | Vis. Index | Piston Skirt | Ring Condition | Demerit Rating | Bearing Corrosion |
|---|---|---|---|---|---|---|---|
| 1 | 1.0 | 0.9 | 65 | 5.0 | Free and Clean | 7.5 | 0.050 |
|  | 1.2 | 1.0 | 86 | 5.0 | do | 8.1 | 0.080 |
| 2(b) | 1.3 | 1.3 | 127 | 6.0 | do | 10.4 | 0.083 |
|  | 1.5 | 1.5 | 112 | 5.0 | do | 9.1 | 0.115 |
|  | 1.6 | 1.3 | 158 | 6.0 | do | 10.5 | 0.173 |
| 3 | 1.4 | 1.2 | 146 | 6.0 | do | 10.1 | 0.148 |
|  | 1.8 | 1.2 | 85 | 6.5 | do | 10.4 | 0.130 |
| 4 | 2.0 | 1.3 | 97 | 7.0 | do | 11.3 | 0.150 |
|  | 1.3 | 1.8 | 111 | 4.0 | do | 8.2 | 0.143 |
| 5 | 1.1 | 1.8 | 115 | 5.0 | do | 9.1 | 0.145 |
|  | 1.0 | 1.6 | 120 | 3.0 | do | 6.8 | 0.118 |
| 7 | 1.2 | 2.0 | 132 | 2.5 | do | 7.1 | 0.100 |
|  | 1.2 | 1.3 | 88 | 3.5 | do | 6.9 | 0.095 |
| 8(b) | 1.4 | 1.5 | 97 | 3.0 | do | 6.9 | 0.143 |
|  | 1.1 | 1.3 | 90 | 3.0 | do | 6.3 | 0.185 |
| 12(b) | 1.5 | 1.5 | 111 | 3.0 | do | 7.1 | 0.128 |

The additives of the invention (Examples 7, 8(b), 11 and 12(b)) are superior to the untreated additive control (Example 1) in demerit rating and not appreciably worse in corrosion. The additives treated with $SO_2$ and $H_2O$, but no KOH (Examples 2(b), 3 and 4), are worse than the control. Example 5 is good, but this additive had bad color.

This shows the importance of the KOH treatment from the standpoint of engine performance.

*Examples 13 to 15*

The preceding examples illustrate treatment of the additive with potassium hydroxide prior to treatment with sulfur dioxide. These examples show the treatment of a sulfur dioxide-treated additive with potassium hydroxide.

20 parts by weight of phosphorus pentasulfide was mixed with 33 parts No. 225 Red oil to form a slurry, and this was mixed with a mixture of 25 parts degras and 75 parts Paratone. 67 parts of Red oil was then added and the mixture agitated at 300° F. for one hour.

The reaction mixture was then placed in a pressure vessel with 1% added water and then treated with sulfur dioxide at a temperature of 250° F. for 30 minutes at a pressure of 10 pounds per square inch above atmospheric. The resulting reaction mixture had 5.13% sulfur, 1.39% phosphorus and an optical density of 1240.

This product was then divided into several portions and reacted with 1% water and 0.06%, 0.125% and 0.25% solid flake potassium hydroxide (85% KOH, 15% $H_2O$) for one hour at 250° F.

The additives were then analyzed for ash and sulfur content and their optical density determined:

| Analysis Additive | Example 13 | Example 14 | Example 15 |
|---|---|---|---|
|  | 0.06% Flake KOH | 0.125% Flake KOH | 0.25% Flake KOH |
| Percent Sulfate Ash | 0.47 | 0.60 | 0.70 |
| Percent Sulfur | 4.68 | 4.49 | 4.49 |
| Optical Density | 1,390 | 1,335 | 1,260 |

These additives showed no increase in hydrogen sulfide stability when tested by the hydrogen sulfide stability test. It will be noted that their sulfur contents decreased slightly and the ash content increased slightly with increased amounts of potassium hydroxide.

These results show that the potassium hydroxide treatment should precede the sulfur dioxide treatment to obtain the improvement in hydrogen sulfide stability due to the potassium hydroxide.

*Examples 16 to 20*

20 parts by weight of phosphorus pentasulfide was mixed with 33 parts No. 225 Red oil to form a slurry, and this was mixed with a mixture of 25 parts degras and 75 parts Paratone. 67 parts of Red oil was then added and the mixture agitated at 300° F. for one hour. The resulting reaction mixture had 5.13% sulfur, 1.39% phosphorus and an optical density of 1240. The additive analyzed 5.13% sulfur and 1.39% phosphorus, and had an optical density of 1240.

This reaction mixture was divided into several portions which were then treated in pressure vessels as set forth below with elemental sulfur, to increase the sulfur level, with potassium hydroxide and with sulfur dioxide, in varying concentrations and in a varying sequence of these three steps, as follows:

| Example No. | Sequence of Steps | | | |
|---|---|---|---|---|
|  | 1 | 2 | 3 | |
| 16 | S | KOH | $SO_2$ | (amount of sulfur constant.) |
| 17 | S | KOH | $SO_2$ | (amount of KOH is constant.) |
| 18 | KOH | S | $SO_2$ | (amount of sulfur constant.) |
| 19 | S | $SO_2$ | KOH | (amount of sulfur constant.) |
| 20 | S | $SO_2$ | KOH | (amount of KOH constant.) |

1% water was added after sulfur treatment in each example except Example 18 where 1% water was added prior to KOH treatment.

The conditions under which the additives were treated and their properties, including hydrogen sulfide stability, are listed in the following tables:

*Example 16*

|  | A | B | C |
|---|---|---|---|
| Additive manufacture: |  |  |  |
|   Sulfur reaction, percent wt | 1% | 1% | 1%. |
|     Reaction time and temp., °F | ½ hr. at 250° | ½ hr. at 250° | ½ hr. at 250°. |
|   KOH reaction, percent wt | 0.125% | 0.250% | 0.50%. |
|     Percent water | 1% | 1% | 1%. |
|     Reaction time and temp., °F | 1 hr. at 250° | 1 hr. at 250° | 1 hr. at 250°. |
|     $SO_2$ reaction time, temp. °F., pressure | ½ hr. at 250°, 10 p. s. i. | ½ hr. at 250°, 10 p. s. i. | ½ hr. at 250°, 10 p. s. i. |
| Analysis additive: |  |  |  |
|   Percent sulfate ash | 0.48 | 1.25 | 1.29. |
|   Percent sulfur | 5.50 | 5.07 | 4.75. |
|   Hydrogen sulfide stability—hrs. to failure. | 72 | 240 | 528. |

*Example 17*

Additive manufacture:
  Sulfur reaction, percent wt _____ 1%.
    Reaction time and temp. °F _____ ½ hr. at 250°.
  KOH reaction, percent wt _____ 0.5%.
    Percent water _____ 1%.
    Reaction time and temp. °F _____ 1 hr. at 250°.
    $SO_2$ reaction time, temp. °F., pressure __ ½ hr. at 200°, 10 p. s. i.
Analysis additive:
  Percent sulfate ash _____ 0.99.
  Percent sulfur _____ 4.85.
  Hydrogen sulfide stability—hrs. to failure__ 288.

*Example 18*

|  | A | | B | | C | |
|---|---|---|---|---|---|---|
| Additive Manufacture: |  |  |  |  |  |  |
|   KOH Treatment, Percent Wt | 0.125% | | 0.250% | | 0.50%. | |
|     Percent Water | 1% | | 1% | | 1%. | |
|     Reaction Time and Temp., °F | 1 hr. at 250° | | 1 hr. at 250° | | 1 hr. at 250°. | |
|   Sulfur Treatment, Percent Wt | 1.0% | | 1.0% | | 1.0%. | |
|     Reaction Time and Temp., °F | ½ hr. at 250° | | ½ hr. at 250° | | ½ hr. at 250°. | |
|     $SO_2$ Reaction Time, Temp., °F., pressure | ½ hr. at 250°, 10 p. s. i. | | ½ hr. at 250°, 10 p. s. i. | | ½ hr. at 250°, 10 p. s. i. | |
|  | (a) | (b) | (a) | (b) | (a) | (b) |
| Analysis Additive: |  |  |  |  |  |  |
|   Percent Sulfate Ash | 0.93 | 0.44 | 1.36 | 0.81 | 1.74 | 1.06 |
|   Percent Sulfur | 4.00 | 4.81 | 3.88 | 4.64 | 3.49 | 4.62 |
|   Hydrogen Sulfide Stability—hrs. to failure | 720 | 720 | 720 | 720 | 720 | 720 |

*Example 19*

|  | A | B | C |
|---|---|---|---|
| Additive Manufacture: |  |  |  |
|   Sulfur Reaction, Percent Wt | 1% | 1% | 1%. |
|     Reaction Time and Temp., °F | ½ hr. at 250° | ½ hr. at 250° | ½ hr. at 250°. |
|     $SO_2$ Reaction Time, Temp., °F., pressure | ½ hr. at 250°, 10 p. s. i. | ½ hr. at 250°, 10 p. s. i. | ½ hr. at 250°, 10 p. s. i. |
|     Percent Water | 1% | 1% | 1%. |
|     Percent KOH | 0.125 | 0.250 | 0.50. |
|   KOH Reaction Time, Temp., °F | 1 hr. at 250° | 1 hr. at 250° | 1 hr. at 250°. |
| Analysis Additive: |  |  |  |
|   Percent Sulfate Ash | 0.74 | 0.90 | 1.35. |
|   Percent Sulfur | 5.57 | 5.41 | 5.27. |
|   Hydrogen Sulfide Stability—hrs. to failure | 480 | 1,440 | 1,440. |

*Example 20*

|  | A | B | C |
|---|---|---|---|
| Additive Manufacture: |  |  |  |
|   Sulfur Reaction, Percent Wt | 1% | 2% | 1.5%. |
|     Reaction Time and Temp., °F | ½ hr. at 250° | ½ hr. at 250° | ½ hr. at 250°. |
|     $SO_2$ Reaction Time, Temp., °F., pressure | ½ hr. at 250°, 10 p. s. i. | ½ hr. at 250°, 10 p. s. i. | ½ hr. at 250°, 10 p. s. i. |
|     Percent Water | 1% | 1% | 1%. |
|     Percent KOH | 0.50 | 0.50 | 0.50. |
|   KOH Reaction Time, Temp., °F | 1 hr. at 250° | 1 hr. at 250° | 1 hr. at 250°. |
| Analysis Additive: |  |  |  |
|   Percent Sulfate Ash | 1.35 | 1.41 | 1.38. |
|   Percent Sulfur | 5.27 | 5.73 | 5.38. |
|   Hydrogen Sulfide Stability—hrs. to failure | 1,400 | 600 | 600. |

In all cases H₂S stability met specifications, and in Examples 18 to 20 it was excellent.

The engine performance of these additives was then determined in the ethyl motor test set forth in Examples 1 to 12, with the following results:

*Example 16*

|  | A | B | C |
| --- | --- | --- | --- |
| Used Oil Analysis: |  |  |  |
| Hours Operation | 20 | 20 | 20 |
| Percent Sludge | 0.20 | 0.10 | 0.20 |
| Acid Number | 0.75 | 0.70 | 0.80 |
| Vis. Increase Used Oil | 7 | 27 | 22 |
| Piston Skirt Number | 0.0 | 0.0 | 0.0 |
| Hours Operation | 40 | 40 | 40 |
| Percent Sludge | 0.35 | 0.45 | 0.40 |
| Acid Number | 1.37 | 1.2 | 1.2 |
| Vis. Increase Used Oil | 50 | 40 | 50 |
| Piston Skirt Number | 0.0 | 0.0 | 0.0 |
| Hours Operation | 60 | 60 | 60 |
| Percent Sludge | 1.0 | 0.9 | 1.0 |
| Acid Number | 1.50 | 1.65 | 1.25 |
| Vis. Increase Used Oil | 103 | 100 | 65 |
| Piston Skirt Rating | 3.5 | 3.0 | 3.0 |
| Condition of Rings | (¹) | (¹) | (¹) |
| Engine Demerit Rating | 7.0 | 6.6 | 5.9 |
| Bearing Corrosion Copper-Lead: |  |  |  |
| Mg. Loss per Half Shell, Ave | 95.0 | 150 | 140 |

¹ Free and clean.

*Example 17*

| Used Oil analysis: |  |
| --- | --- |
| Hours operation | 20 |
| Percent sludge | 0.20 |
| Acid No | 0.60 |
| Vis. increase used oil | 15 |
| Piston skirt No | 0.0 |
| Hours operation | 40 |
| Percent sludge | 0.6 |
| Acid No | 1.2 |
| Vis. increase used oil | 45 |
| Piston skirt No | 0.0 |
| Hours operation | 60 |
| Percent sludge | 1.9 |
| Acid No | 1.7 |
| Vis. increase used oil | 105 |
| Piston skirt No | 2.25 |
| Condition of rings | (¹) |
| Engine demerit rating | 6.95 |
| Bearing corrosion copper-lead: |  |
| Mg. loss per half shell, ave | 110 |

¹ Free and clean.

*Example 18*

|  | A | B | C |
| --- | --- | --- | --- |
| Used Oil Analysis: |  |  |  |
| Hours Operation | 20 | 20 | 20 |
| Percent Sludge | 0.10 | 0.15 | 0.20 |
| Acid No | 0.70 | 0.70 | 0.75 |
| Vis. Increase Used Oil |  | 10 | 30 |
| Piston Skirt No |  |  |  |
| Hours Operation | 40 | 40 | 40 |
| Percent Sludge | 0.50 | 0.25 | 0.70 |
| Acid No | 1.10 | 1.0 | 1.20 |
| Vis. Increase Used Oil | 40 | 40 | 65 |
| Piston Skirt No | 0.0 | 0.0 | 0.0 |
| Hours Operation | 60 | 60 | 60 |
| Percent Sludge | 1.1 | 1.0 | 2.0 |
| Acid No | 1.4 | 1.5 | 1.6 |
| Vis. Increase Used Oil | 75 | 76 | 140 |
| Piston Skirt No | 3.0 | 3.25 | 4.25 |
| Condition of Rings | (¹) | (¹) | (¹) |
| Engine Demerit Rating | 6.25 | 6.50 | 9.2 |
| Bearing Corrosion Copper-Lead: |  |  |  |
| Mg. Loss per Half Shell, Ave | 145 | 140 | 93 |

¹ Free and clean.

*Example 19*

|  | A | B | C |
| --- | --- | --- | --- |
| Used Oil Analysis: |  |  |  |
| Hours Operation | 20 | 20 | 20 |
| Percent Sludge | 0.20 | 0.20 | 0.10 |
| Acid No | 1.0 | 1.1 | 1.0 |
| Vis. Increase Used Oil | 36 | 88 | 15 |
| Piston Skirt No | 0.0 | 0.0 | 0.0 |
| Hours Operation | 40 | 40 | 40 |
| Percent Sludge | 0.50 | 0.25 | 0.20 |
| Acid No | 1.35 | 1.5 | 1.60 |
| Vis. Increase Used Oil | 75 | 50 | 50 |
| Piston Skirt No | 1.0 | 0.0 | 0.0 |
| Hours Operation | 60 | 60 | 60 |
| Percent Sludge | 0.80 | 0.70 | 0.80 |
| Acid No | 1.75 | 1.85 | 1.75 |
| Vis. Increase Used Oil | 79 | 77 | 60 |
| Piston Skirt No | 3.25 | 2.5 | 2.5 |
| Condition of Rings | (¹) | (¹) | (¹) |
| Engine Demerit Rating | 6.55 | 5.8 | 5.7 |
| Bearing Corrosion Copper-Lead: |  |  |  |
| Mg. Loss per Half Shell, Ave | 100 | 130 | 140 |

¹ Free and clean.

*Example 20*

|  | A | B | C |
| --- | --- | --- | --- |
| Used Oil Analysis: |  |  |  |
| Hours Operation | 20 | 20 | 20 |
| Percent Sludge | 0.10 | 0.20 | 0.15 |
| Acid No | 1.0 | 0.80 | 0.62 |
| Vis. Increase Used Oil | 15 | 14 | 6 |
| Piston Skirt No | 0.0 | 0.0 | 0.0 |
| Hours Operation | 40 | 40 | 40 |
| Percent Sludge | 0.20 | 0.75 | 0.50 |
| Acid No | 1.60 | 1.25 | 0.80 |
| Vis. Increase Used Oil | 50 | 75 | 31 |
| Piston Skirt No | 0.0 | 1.8 | 0.0 |
| Hours Operation | 60 | 60 | 60 |
| Percent Sludge | 0.80 | 2.0 | 1.5 |
| Acid No | 1.75 | 1.6 | 1.3 |
| Vis. Increase Used Oil | 60 | 105 | 92 |
| Piston Skirt No | 2.5 | 4.75 | 3.5 |
| Condition of Rings | (¹) | (¹) | (¹) |
| Engine Demerit Rating | 5.6 | 9.50 | 7.2 |
| Bearing Corrosion Copper-Lead: |  |  |  |
| Mg. Loss per Half Shell, Ave | 140 | 145 | 142 |

¹ Free and clean.

A study of the above data shows that a major improvement in additive potency of the order of 25% is effected through the combined use of sulfur, sulfur dioxide and potassium hydroxide. Bearing corrosion was increased, but not to a value beyond the permissible limits.

The additives produced by Example 19, i. e., treated with sulfur, then with sulfur dioxide and then with potassium hydroxide, were evaluated by the L–4 Chevrolet engine test in a 3% concentration (50% oil-additive mixture) in a SAE No. 20 motor lubricating oil.

A demerit rating of 3–5 was obtained. This lubricating oil was kept for almost one year at room temperature without any evolution of hydrogen sulfide.

*Example 21*

20 parts by weight of phosphorus pentasulfide was mixed with 33 parts No. 225 Red oil to form a slurry, and this was mixed with a mixture of 25 parts degras and 75 parts Paratone. 67 parts of Red oil was then added and the mixture agitated at 300° F. for one hour. The resulting reaction mixture had 5.13% sulfur, 1.39% phosphorus and an optical density of 1240.

The additive was treated with 1% potassium hydroxide and 1% water for one hour at 180° F. and one hour at 250° F. The product was then tested by the hydrogen sulfide stability test. Hydrogen sulfide was detected after 24 hours, heating at 150° F. The alkali treating removed considerable sulfur, reducing it to below 3.5%, while the ash content was considerably increased to 1.85 which is above permissible specification limits. When tested for Engine performance in a 6% solution in a standard Mid-Continent lubricating oil SAE 20, using the ethyl motor, Procedure II (see Examples 1 to 12), the following properties were noted:

| Hours of Operation | 20 | 40 | 60 |
|---|---|---|---|
| Percent Sludge | 0.1 | 0.6 | 2.0. |
| Acid No | 0.80 | 1.6 | 1.7. |
| Viscosity Increase | 12 | 120 | 1.30. |
| Piston Skirt No | 0.0 | 1.0 | 5.0. |
| Demerit Rating | | | 10.0. |
| Condition of Rings | | | Free and Clean. |
| Copper-Lead Corrosion | | | 60.0. |

This shows that treatment with potassium hydroxide alone is not satisfactory, from the standpoint both of H₂S stability and of engine performance.

The above working examples of specific embodiments are for illustrative purposes only and are not intended as limitations of the invention. In view of the foregoing disclosure, the art will clearly understand the invention in its broad aspects, including variations and modifications thereof.

The process of the invention is capable of producing odorless exceptionally odor-stable phosphorus sulfide-oxygen-containing organic compound additives. The treatment also may increase the sulfur content of these products, but if it does the sulfur content of the final additive is not more than about 1.5% higher than that of the starting additive. The potency of the product in engine performance is affected only slightly, if at all, and may even be improved. Consequently, the products of the invention are of general utility as additives for oils or greases.

The amount of the final additive to be incorporated in an oil or grease will depend upon the characteristics of the oil or grease and the intended use. Some oils have more of a tendency to corrode metals or to form acids, sludges and lacquer deposits than others, and such oils require larger quantities of the addition agent. Also, oils that are intended for use at higher temperatures require larger amounts of the additive. In general, from about 1 to about 10% of the additive is employed. Under some circumstances, amounts as low as 0.01% show a significant improvement. Since the phosphorus sulfide-oxygen-containing organic compound additive is itself a lubricant, there is no upper limit. However, it may be uneconomical to include in the lubricant more of the additive than is necessary to impart the desired properties. Generally, not over 50% will be employed.

If desired, the additives of the invention may be used together with other oil addition agents, e. g., pour point depressants or film strength agents. In some instances it is desirable to include a lubricating oil containing the additive as agent for improving the clarity of the oil, e. g., lecithin, lauryl alcohol and the like, which are well known to the art, and in order to prevent foaming of the oil it is desirable in some cases to add small amounts of tetraamyl silicate, an aryl alkyl carbonate or polyalkyl silicone.

All parts and percentages in the specification and claims are by weight.

This application is a continuation-in-part of application Serial No. 316,781, filed October 24, 1952, now abandoned.

I claim:

1. A process of stabilizing phosphorus sulfide-oxygen-containing organic compound additives against generation of hydrogen sulfide which comprises treating the additive separately with at least 0.1% up to about 1% potassium hydroxide and with at least about 0.5% up to about 5% sulfur dioxide at a temperature of at least about 150° F. but below a temperature at which the additive would be decomposed, and under conditions of pressure and time to effect chemical reaction between the potassium hydroxide and the sulfur dioxide and hydrogen sulfide-producing components of the additive and produce an additive which has a sulfur content less than about 1.5% higher than that of the starting additive and which meets the requirements of the hydrogen sulfide stability test.

2. A process in accordance with claim 1 in which the reactions are carried out at a temperature of from about 175 to about 250° F.

3. A process in accordance with claim 1 which comprises adding at least 0.25% water to the additive prior to treatment with sulfur dioxide.

4. A process in accordance with claim 1 which comprises adding at least 0.25% water to the additive prior to treatment with potassium hydroxide.

5. A process in accordance with claim 1 in which the sulfur dioxide reaction is carried out under superatmospheric pressure.

6. A process in accordance with claim 1 which includes reacting the product with elemental sulfur.

References Cited in the file of this patent
UNITED STATES PATENTS

| 2,079,782 | Wells | May 11, 1937 |
| 2,481,487 | Adelson | Sept. 13, 1949 |
| 2,510,031 | Folda | May 30, 1950 |
| 2,637,722 | Frazier | May 5, 1953 |